March 3, 1953 R. F. TURNBULL 2,630,152
ROCKING TYPE PORTABLE ROUTER
Filed May 22, 1950 2 SHEETS—SHEET 1
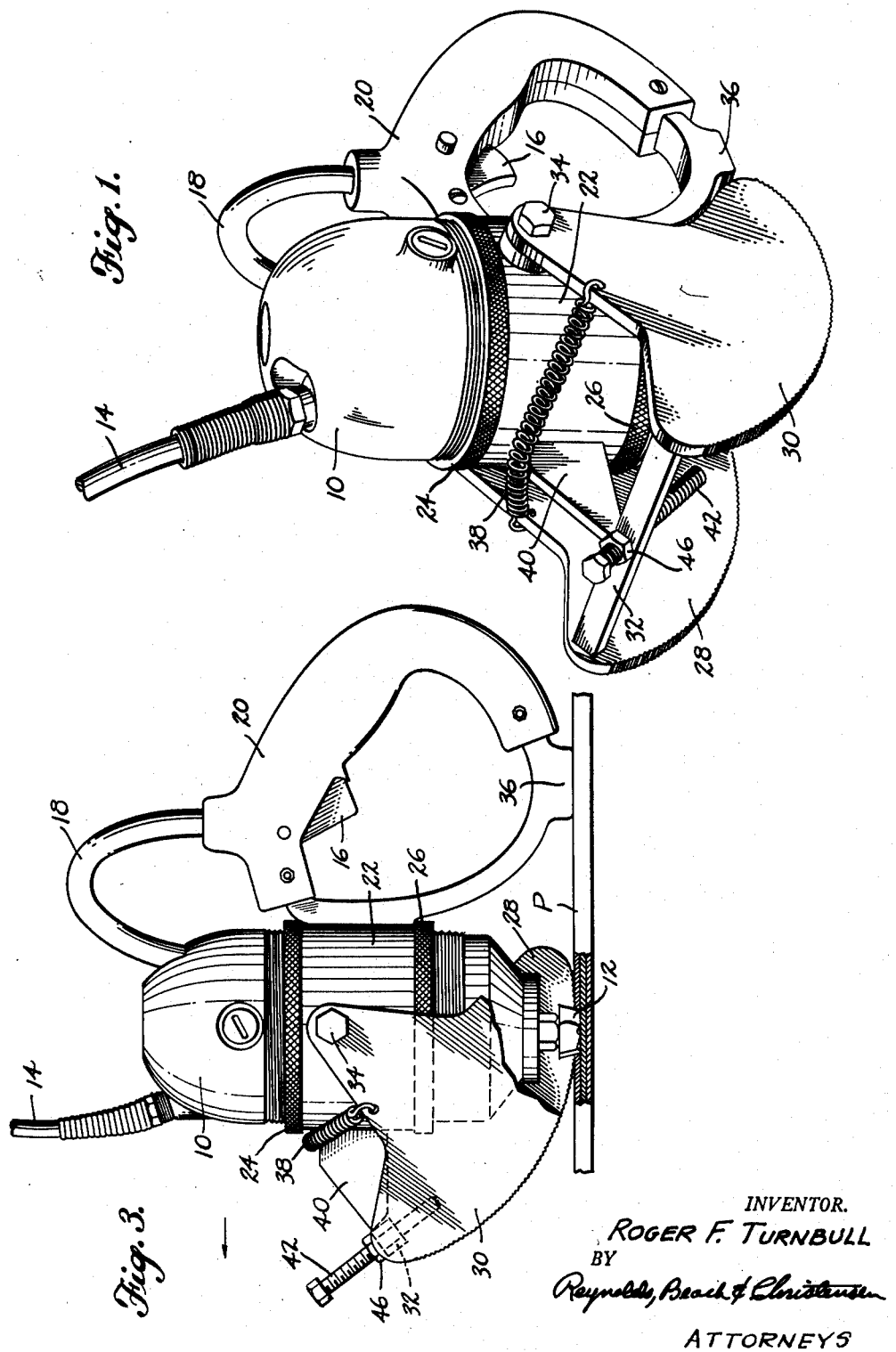
INVENTOR.
ROGER F. TURNBULL
BY
Reynolds, Beach & Christensen
ATTORNEYS March 3, 1953 R. F. TURNBULL 2,630,152
ROCKING TYPE PORTABLE ROUTER
Filed May 22, 1950 2 SHEETS—SHEET 2
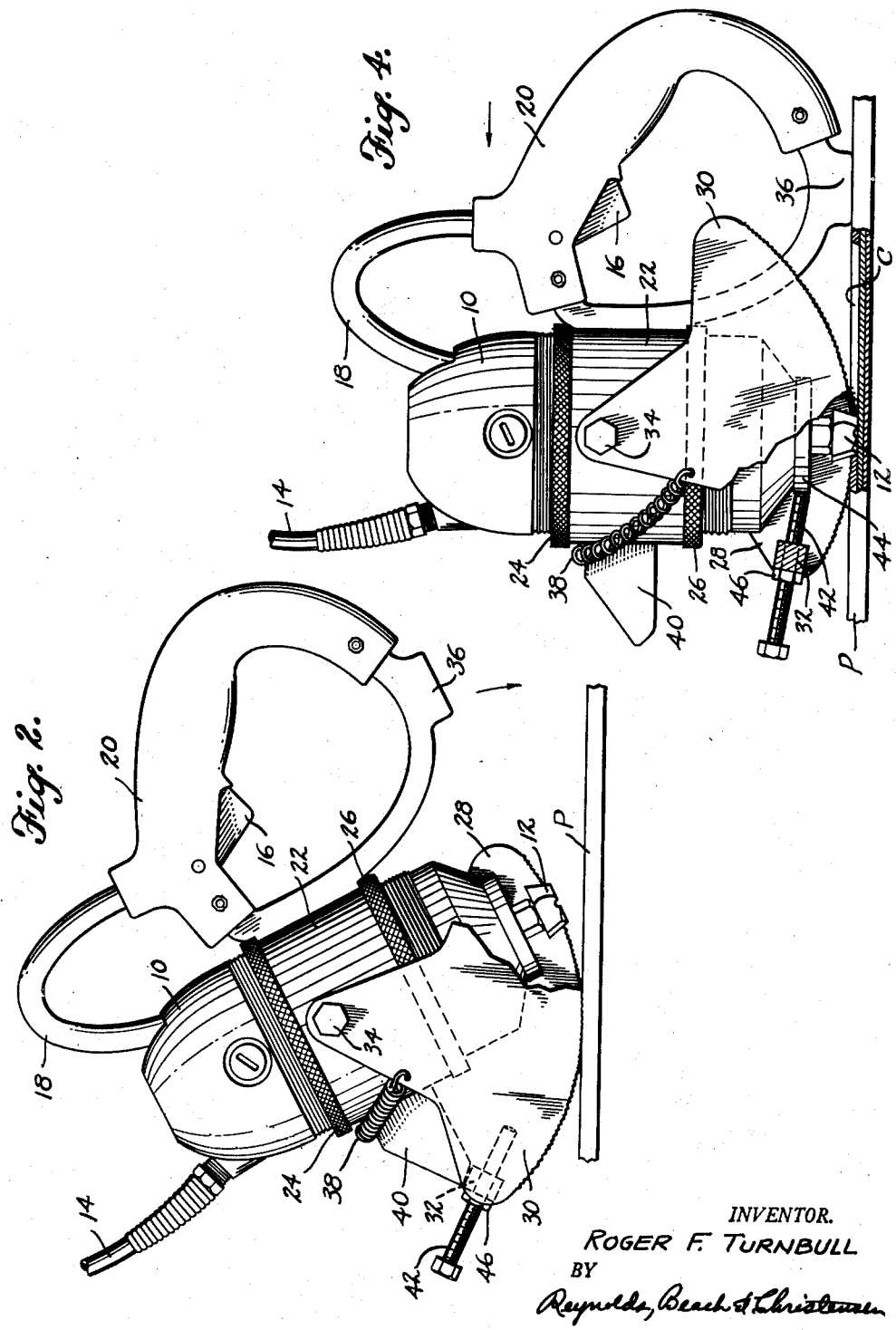
INVENTOR.
ROGER F. TURNBULL
BY
Reynolds, Beach & Christensen
ATTORNEYS Patented Mar. 3, 1953

2,630,152

UNITED STATES PATENT OFFICE 2,630,152

ROCKING TYPE PORTABLE ROUTER

Roger F. Turnbull, Tacoma, Wash., assignor to American Manufacturing Company, Inc., Tacoma, Wash., a corporation of Washington Application May 22, 1950, Serial No. 163,502

11 Claims. (Cl. 144—136)

This invention relates to a portable router for use in plywood patching operations or similar applications requiring cutting into the face of a plywood panel, for example, to remove a defect area and form a standard cavity of precise dimensions and shape to receive a precision-cut standard patch.

One of the operations necessary to the manufacture of commercial grade plywood is the removal of bark seams, pitch pockets and other flaws occurring in the face ply. The cutaway blemish areas are then replaced with accurately fitted patches of clear veneer as inconspicuous as possible. A hand tool in the nature of a gouge or chisel having an arcuately shaped cutting edge was used most frequently heretofore in cutting the standard patch cavities. The outline of such a cavity was cut by two impressions of the tool to surround the blemish area with a continuous boat-shaped cut line. Thereupon the enclosed face ply material was gouged out with the same or another hand tool to form a clean recess usually of a depth equal to the thickness of the face ply. A standard patch of like shape and dimensions was then pounded into the recess and held there by a suitable adhesive.

While workmen became extremely skilled at patching plywood in this manner, nevertheless the exacting step of cutting the patch cavities as described was time consuming and expensive. Moreover, even the best workmen would make occasional mistakes which had to be covered up by additional patching.

While suggestions have been made for power routers to be used in this operation, my present invention offers certain definite advantages over them.

An object of my present invention is to provide a portable router tool for cutting patch cavities, for instance, with greater precision and rapidity than heretofore.

A related object is to devise a manually operated portable power router of that type having support means which, with unobstructed view, can be placed directly on a plywood panel wherever a defect area is to be removed for patching, and will then form a stable reference by which to establish accurately the line of movement and limits of movement of the router tool.

Another object of the invention is to provide a hand-operated power router for the purposes indicated which will be of comparatively light weight construction for greater ease of handling, and yet will possess the necessary stability for precision work with minimum reliance placed upon manual skill and dexterity. In this connection it is particularly important that the operator be relieved as completely as possible from controlling the line or limits of cutting and of maintaining the desired perpendicular relationship of the tool axis to the panel during the operation.

In the preferred form, the support means for the router head comprises parallel quadrant or sector plates having arcuately curved panel-engaging edges, which plates are aligned and interconnected to form cooperating rockers. The router head is supported by and between these rockers for relative tilting about an axis coincident with the center of arc of said edges. Preferably, although not essentially, this tilt axis intersects the router tool rotation axis which, in the initial position of the parts when placing the router on the panel, is inclined relative to the panel so that the router tool will be out of contact therewith and the blemish area to be cut will be exposed to full view. A slide shoe member fixedly connected to the router head completes the support means, having a panel-engaging surface so spaced from the router head tilt axis and rocker edges that the tool rotation axis will be established and accurately maintained thereby perpendicular to the plane of the panel during cutting.

Stops are provided to limit relative tilting of the router head and the interconnected rockers to within a selected angular range. This angle of tilt corresponds to the length of cut in the panel which can be effected by progressive translational movement of the vertically oriented router head accompanying rocking of the quadrant plates from one limiting position to the other relative to the router head.

These and other features, objects and advantages of the portable router will become apparent from the following detailed description thereof based upon the accompanying drawings.

Figure 1 is a perspective view of the portable router.

Figure 2 is a side elevation view of the router in its initial position as placed on the plywood panel preparatory to commencing the actual cutting operation.

Figure 3 is a similar view in which the router is established at the starting point of the actual cutting operation.

Figure 4 is a similar view in which the router has reached the final or terminal point of the cutting operation.

As illustrated, the router head comprises an electric motor 10 or equivalent power source for driving a router tool 12 in a hand-operated power router meeting the requirements of compactness, portability and power for the described type of operation. The casing of this motor is generally cylindrical, electric power being supplied through the power cord 14 entering the top of the casing, and electric switching of the motor between "on" and "off" conditions being accomplished by a suitable switch operated by trigger 16 and having terminals connected in the motor energizing circuit through the electric cord 18. The switch (not shown) is encased within the upper portion of a router handle 20 fixedly connected to one side of a collar 22 slidably encircling and supporting the motor 10. Knurled lock nuts 24 and 26 engage the threaded exterior of the motor casing at upper and lower edges of collar 22 for locking the casing in various axially adjusted positions in the supporting collar 22.

The supporting collar 22 in turn is supported pivotally on pins 34 by and between rockers 28 and 30 having circularly arcuate panel-engaging lower edges which are serrated or otherwise adapted for frictional or non-skid engagement with the panel P. These rockers are interconnected at one end by the crossbar 32 which maintains them in alignment. The collar-supporting transversely aligned pivots, one in each rocker, are located at the center of curvature of the arcuate rocker edges. As a result, the tilt axis of the router head is maintained parallel to the plane of the panel and spaced at a constant distance therefrom as such router head moves in translation along the straight line established by rocking movement of the rockers 28 and 30, as later described.

As shown in Figure 3, the tilt axis of the router head is not only in right angle relationship with but actually intersects, the tool rotation axis; however in some instances it may be considered desirable to mount the router head between the sector plates for relative tilting with the tool rotation axis offset from the tilt axis although still in right angle relationship therewith.

In Figure 3 it will be observed that the radially projecting distance of the tip of router tool 12 from the tilt axis of the router head is somewhat greater than the rocker radius. Accordingly, when the rockers rest on a panel and the router head is swung into perpendicular relationship therewith the tool will cut into the panel to a depth equal to the difference between such rocker radius and tool tip projecting radius. The depth of cut is adjustable as later explained.

In order to insure that the tool axis will be maintained perpendicular to the panel during a cutting operation as desired without special attention from the operator, the router has a slide shoe 36 formed on a downward extension of the handle 20 or otherwise fixedly connected to the rounter head-supporting collar 22. The panel contacting bottom surface of this shoe is preferably smooth and lies in a plane perpendicular to the router tool rotation axis. Further, such shoe surface plane is spaced from the router head tilt axis by a perpendicular or vertical distance substantially equal to the radius of curvature of the rocker edges. Moreover, the shoe is spaced in said plane at a substantial distance from the imaginary line of contact or tangency of the two rockers when resting on the panel, as shown in Figure 3. In effect, therefore, the two rockers and the slide shoe 36 provide a stable triangular support for the router head and maintain the tool rotation axis substantially vertical in all positions of the router obtainable by swinging of the rockers on the panel.

The return spring 38 is connected by its ends to the quadrant plates 28 and 30 and is deflected at its mid-portion by passing over a shoulder provided by a projecting abutment or stop member 40 fixed on the side of the support collar 22 opposite from the handle 20. The end of this abutment member is located in the path of swing of the crossbar 32 and by its engagement therewith limits relative tilting of the router head and rockers in one direction as shown in Figure 2. The return spring 38 normally urges the rockers into that limiting position of tilt relative to the router head. This is the desired position of the parts when the router is first placed on a panel with the router rotation axis inclined to the plane of the panel and the slide shoe 36 elevated some distance therefrom as shown in Figure 2, providing a clear view of the initial panel cutting area.

While permitting the abutment 40 to be held by the spring in contact with the crossbar abutment 32 the router is then swung bodily downward on the rockers, until the router tool 12, now being rotated at high speed by the motor 10, contacts the panel. As the tool progressively penetrates the panel by further swinging in the same sense, the shoe 36 finally contacts the panel as shown in Figure 3, and establishes the tool rotation axis perpendicular to the panel. This figure illustrates the starting position of the actual cutting operation, in which the router head and rockers are still in the same limit position of relative tilt as established by engagement of the abutment 40 and the crossbar 32. The rockers are then oriented in the desired direction for progressive advancement of the tool, which is normally parallel to the grain of the wood.

Grasped by its handle 20, the router is then pushed over the panel along such line of advancement, while pressing it down firmly against the panel to insure uniformly steady contact of the slide shoe 36 and serrated rocker edges with the surface of the panel. During such advancement the rocker edge serrations prevent tangential slippage of the rockers on the panel and thereby insure straight-line movement of the tool. The depth of cut remains constant during progressive translational movement of the router head by rocking of the quadrant sectors 28, 30 because of the constant radius of curvature of the lower edges of these sectors engaging the panel. This progressive movement is continued until, as shown in Figure 4, the end of a stop screw 42 threaded in crossbar 32 engages the annular shoulder 44 on the lower end portion of the router motor. Since the router head remains vertical, such stop engagement limits relative tilting of the rockers and router head in that direction and thereby stops further advancement of the router along the panel. The length of cut in the panel is thus accurately measured by the free angle of relative tilting between the rockers and router head as established by the two sets of stops.

The tool is then raised or retracted from the panel by allowing the now tensioned return spring 38 to tilt the router head reversely relative to the rockers which continue to be pressed by the operator into engagement with the panel although the handle 40 and slide shoe 36 will now be allowed to swing gradually upwardly from the panel so that the spring does not snap the rockers back with a jar.

The length of cut formed by the router advanced progressively over the panel in the described manner may be adjusted accurately to conform to the standard patch length by adjustment of abutment screw 42 in crossbar 32, a lock nut 46 holding it in any adjusted position. The depth of cut in the panel may be adjusted accurately to correspond to the thickness of the face ply by axial adjustment of the motor 10 in the supporting collar 22, the lock nuts 24 and 26 holding the motor casing in any of various adjusted positions.

The standard cut or patch cavity C produced by the router is elongated with each end rounded in a semicircle. Its opposite edges preferably taper inward. Standard patches of the same shape and size are produced from clear veneer to fit in these cavities as desired.

I claim as my invention:

1. A portable router for cutting cavities in a panel, comprising a router head and router tool driven thereby for gouging patch cavities from the panel with the tool's rotational axis substantially perpendicular to the panel, and router support means comprising parallel rocker elements having substantially circularly arcuate panel-engaging lower edges, means interconnecting the rocker elements and maintaining the same in mutually aligned positions, pivot means supported by said rocker elements and in turn supporting said router head disposed between said rocker elements and guiding said head for relative swinging about an axis parallel to the panel and at the center of curvature of said rocker elements' arcuate edges, and with the tool's rotation axis in right angle relationship to the pivot means' axis, limiting means comprising abutments carried by said rocker elements and said router head, respectively, and interengageable to limit relative swinging thereof in one direction at an angular position of the tool's rotational axis within the subtended angle of the rocker elements' arcuate edges, opposite limiting means comprising abutments carried by said rocker elements and said router head respectively and interengageable to limit relative swinging thereof oppositely through an angle less than the arc length of the rockers, and stabilizing means projecting from the router head in fixed relation thereto and generally normally to the pivot means' axis, said stabilizing means having a panel engaging terminal portion disposed in a plane tangential to the rocker elements' arcuate edges and spaced appreciably from the line of contact of the rocker elements with the panel when the tool rotational axis is substantially perpendicular to the panel, whereby simultaneous contact of the panel by said rocker elements and terminal portion of the stabilizing means maintains said tool rotation axis substantially perpendicular to the panel during straight-line translation of the router head over the panel effected by rocking movement of the rocker elements from an initial position corresponding to the first mentioned limiting position of such rocker elements relative to the router head, to the second position, while maintaining constant spacing equal to the rocker radius, between the tilt axis of the router head and the panel.

2. The portable router defined in claim 1, and spring means normally urging the router head into the first limiting position relative to the rocker elements but yieldable to permit opposite relative swinging thereof.

3. The portable router defined in claim 1, and spring means normally urging the router head into the first limiting position relative to the rocker elements but yieldable to permit opposite relative swinging thereof, the stabilizing means terminal portion comprising a slide shoe slidably engageable with the panel.

4. The portable router defined in claim 1, wherein the stabilizing means terminal portion comprising a slide shoe slidably engageable with the panel.

5. The portable router defined in claim 4, wherein the rocker elements comprise approximately quadrant-shaped plates, the work-contacting edges of which are serrated for increased traction preventing tangential sliding of such edges on the plywood panel.

6. The portable router defined in claim 4, wherein the stabilizing means further includes a handle portion projecting generally laterally and downward from the router head on the side thereof generally away from the rockers in the first-mentioned limiting position, the slide shoe being carried by a lower portion of said handle portion.

7. The portable router defined in claim 1, wherein the router head is carried by the support means with the tool rotation axis intersecting the axis of the pivot means.

8. A portable cutting tool comprising a power head and cutting tool element driven thereby for cutting into the surface of a piece of work, and power head support means comprising parallel rocker elements having arcuately curved work-engaging lower edges, means interconnecting said rocker elements and maintaining the same in mutually aligned positions, pivot means supported by said rocker elements and in turn supporting said head in cutting position disposed between said rocker elements and guiding said head for relative swinging about an axis parallel to the work surface and at the center of curvature of said rocker elements' arcuate edges, limiting means comprising abutments carried by said rocker elements and said power head, respectively, and interengageable to limit relative swinging thereof in one direction at an angular position of the tool element within the subtended angle of the rockers, spring means normally urging said head into said limiting position relative to said rockers but yieldable to permit opposite relative swinging thereof, opposite limiting means comprising abutments carried by said rocker elements and said power head to limit relative swinging thereof oppositely through an angle less than the arc length of the rocker elements, and stabilizing means projecting from the power head in fixed relation thereto and generally normally to the pivot means' axis, said stabilizing means having a slide shoe thereon slidably engaging the work surface at a location spaced appreciably from the contact of said rocker elements thereon with the power head supported thereby in cutting position, whereby simultaneous contact of the work surface by said rocker elements and slide shoe maintains said head in cutting position during straight-line translation of the power head along the work surface effected by rocking movement of said rocker elements from an initial position corresponding to the first-mentioned limiting position of such rocker elements relative to the head, to the second such position, while maintaining constant spacing equal to the rocker radius between the axis of said pivot means and the work.

9. In a portable power cutting tool, means supportingly guiding the tool head for progressive movement along a selected straight line on the work surface while maintaining the tool at a predetermined depth of cut in the work, said means comprising a tool head mount adapted for positioning the tool head in cutting position relative to the work, and work-engaging means supporting said tool head mount including first and second support means respectively having work contacting portions spaced apart in the direction of such rectilinear movement and stabilizing said mount against tilting in a plane including such rectilinear movement direction, the work contacting portion of one such support means including elements spaced apart transversely of such direction of movement to stabilize said mount against tilting in a plane perpendicular to such rectilinear movement direction and said one such support means comprising rocker means supportingly connected to said mount for pivoting relative thereto about an axis both transverse to the direction of such rectilinear movement and parallel to the work surface, such rocker means having an arcuately curved work-contacting portion engageable with the work surface, and guiding said tool head for rectilinear movement thereover.

10. The portable power cutting tool defined in claim 9, wherein the support means comprising the rocker means includes two rigidly interconnected transversely spaced and aligned rocker elements having serrated arcuately curved work-contacting edges, and the other support means comprises a slide shoe slidably engageable with the work.

11. The portable power cutting tool defined in claim 10, and stop means limiting angular movement of the rocker means relative to the mount at angularly spaced limit positions, and spring means urging such rocker means into one of such limit positions relative to said mount.

ROGER F. TURNBULL.

REFERENCES CITED

The following references are of record in the file of this patent:

UNITED STATES PATENTS

| Number | Name | Date |
|---|---|---|
| 1,532,683 | Carter | Apr. 7, 1925 |
| 1,569,490 | Hiscock | Jan. 12, 1926 |
| 1,865,759 | Hughes | July 5, 1932 |